Nov. 24, 1964  S. KLENCKE  3,158,004
APPARATUS FOR FREEZE CONCENTRATION
Filed Nov. 2, 1961  3 Sheets-Sheet 1

INVENTOR
Siegfried KLENCKE

By Toulmin & Toulmin
Attorneys

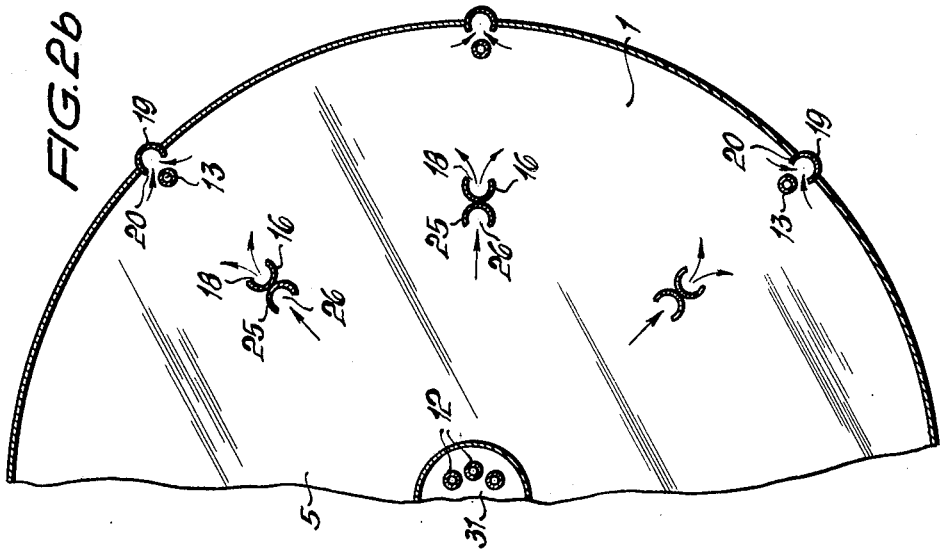
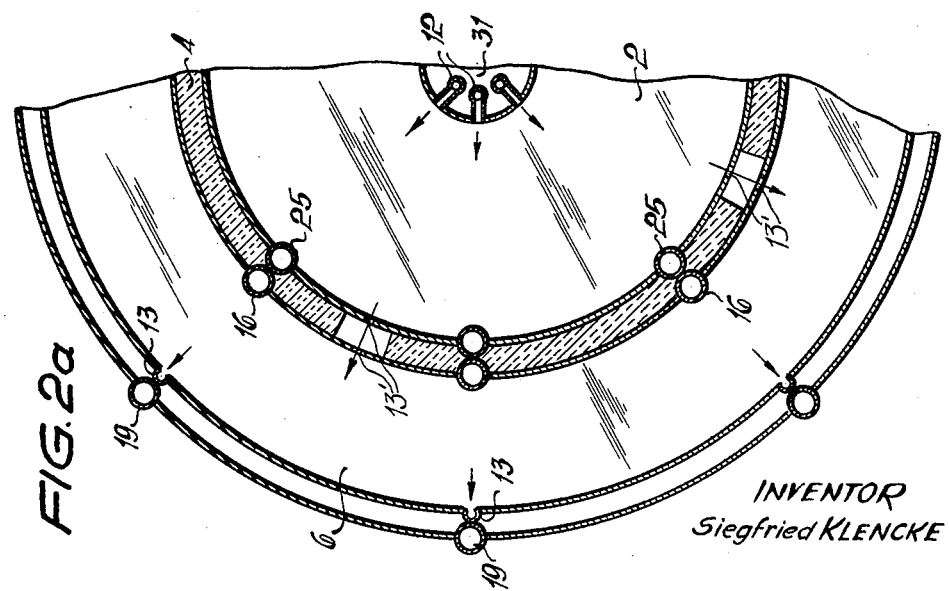

INVENTOR
Siegfried KLENCKE

By Toulmin & Toulmin
Attorneys

United States Patent Office 3,158,004
Patented Nov. 24, 1964

3,158,004
APPARATUS FOR FREEZE CONCENTRATION
Siegfried Klencke, 33 Stuckenborstel uber
Rotenburg, Hannover, Germany
Filed Nov. 2, 1961, Ser. No. 149,687
7 Claims. (Cl. 62—124)

The present invention relates to the freeze concentration of aqueous liquids containing solids, more particularly, to an apparatus for the freeze concentration of liquids containing solids wherein the liquids are circulated through an evaporator under the action of centrifugal force produced by rotation of the evaporator.

In the freeze concentration of liquids containing solids the water in the liquids is frozen into ice crystals and subsequently removed therefrom. The removal of the water in the form of ice crystals results in a greater percentage of solids in the liquid and accordingly a concentration thereof. In most such processes the freezing of the water into ice crystals comprises one phase and the removal of the ice crystals from the liquid by suitable means comprises a second phase. Since these two phases must generally be carried out in sequence and with different forms of apparatus, the above-described processes have the great disadvantage that they must be conducted in two separate operations.

It is therefore the principal object of the present invention to provide a novel and improved apparatus for the continuous freeze concentration of liquids containing solids.

It is a further object of the present invention to provide an apparatus for the freeze concentration of liquids containing solids wherein the water can be frozen into ice crystals and the ice crystals removed from the liquid concurrently.

The present invention discloses an apparatus which is suitable for use with many different forms of liquids containing solids such as fruit juices, vegetable juices, milk, beer, wine, drugs, chemicals, and sea water.

The apparatus of the present invention essentially comprises a casing which is rotatable about a vertical axis and has a refrigerating system including a compressor mounted on the bottom thereof. Vertically arranged within the casing is a plurality of hollow annular bodies which define therebetween a plurality of vertically positioned annular spaces. The hollow annular bodies are connected to the refrigerating system in such a manner that the inner portions of the hollow bodies function as condensers and the outer portions of the hollow bodies function as evaporators. The portions of the hollow bodies defining the evaporators comprise the freezing surfaces of the freezing zones of the apparatus.

A plurality of vertical tubes connects the outer ends of the condensers with a vertical tube in the center of the assembly for withdrawing melted ice crystals from the condensers.

The liquid concentrate is withdrawn from the outer ends of the evaporators through a plurality of vertical tubes connected thereto.

A plurality of vertical tubes is connected to the inner ends of the evaporators for introducing the liquid into the freezing chambers. The incoming liquid is passed in heat-exchange relationship with the melted ice crystals so that the liquid is precooled prior to entering the evaporator.

A freely rotating vane assembly may be positioned adjacent the freezing surfaces of the evaporators so as to scrape accumulations of ice crystals therefrom. The accumulation of ice crystals from these freezing surfaces can be periodically removed in other ways as will be presently described.

In this invention the incoming liquid is introduced into the inner ends of the evaporators after having been precooled by passing in counterflow to the melted ice crystals being withdrawn from the unit. As the liquid flows outwardly through the annular spaces comprising the evaporators, the water in the liquid is frozen into ice crystals. The resulting liquid concentrate which is of a greater density than the ice crystals is pushed radially outwardly under the action of centrifugal force. This movement outwardly of the heavier liquid concentrate tends to force the ice crystals radially inwardly. The ice crystals move radially inwardly until they reach the condensers wherein they are melted. The water resulting from the melting of the ice crystals is then withdrawn from the outer edges of the condensers.

Some of the water will flow radially outwardly from the condensers into the evaporators where it will be refrozen into ice crystals. The same procedure will then be followed and the ice crystals will return radially inwardly to be melted and subsequently withdrawn from the assembly.

The water flowing radially outwardly from the condensers will serve to wash some of the liquid which has adhered to the ice crystals. This washing will occur since the water will be moving radially outwardly while the ice crystals will be moving radially inwardly.

Other objects and advantages of this invention will be apparent upon reference to the accompanying description when taken in conjunction with the following drawings, wherein FIGURE 1 is a vertical sectional view of the apparatus of the present invention;

FIGURE 2a is a transverse sectional view of the apparatus as shown in FIGURE 1, taken through the hollow annular members;

FIGURE 2b is a transverse sectional view of the apparatus of FIGURE 1, taken through the annular spaces.

A specific embodiment of the apparatus of this invention and a specific example of the process of this invention will next be described in detail with reference to the drawings wherein like reference symbols indicate the same parts throughout the various views.

Figure 1:
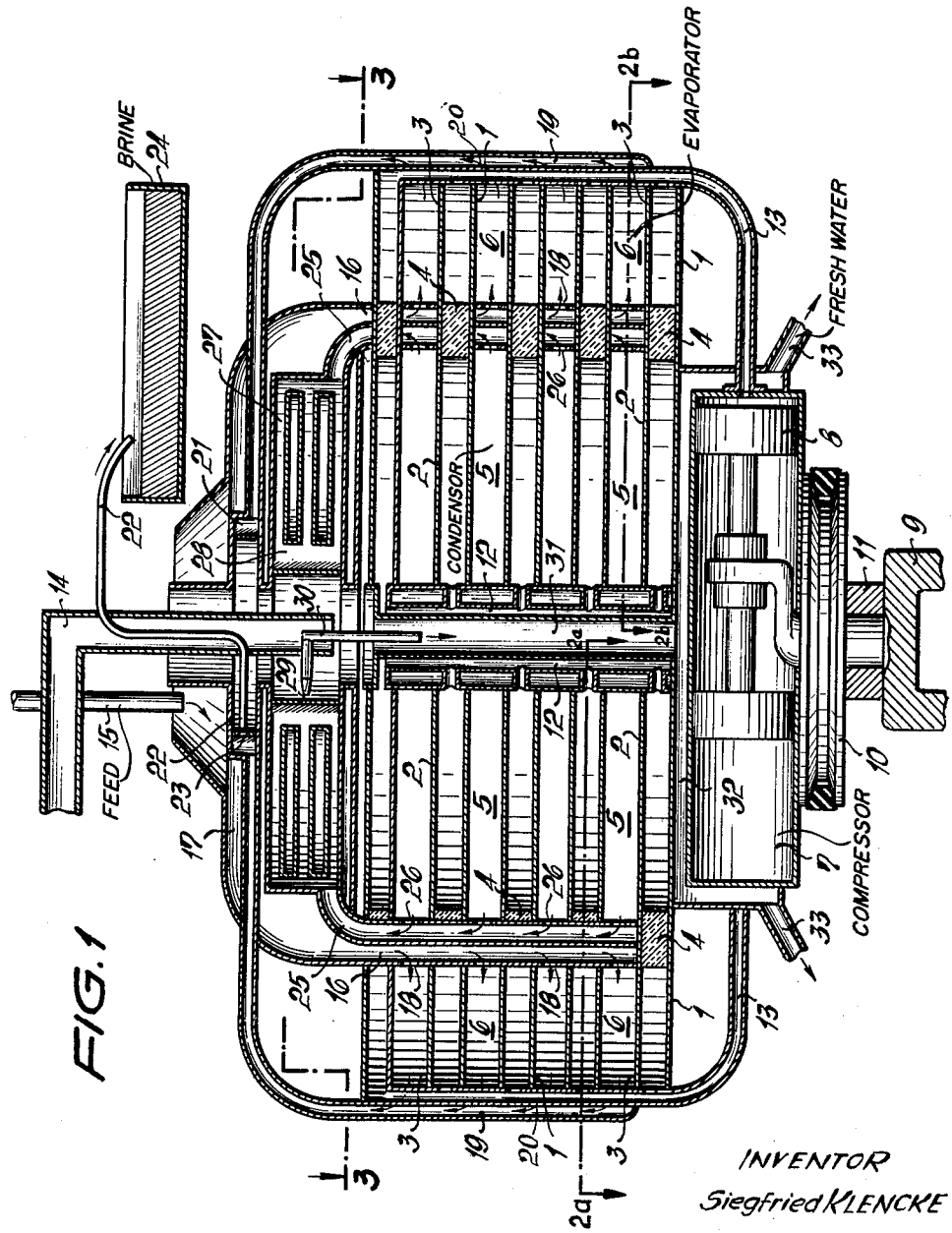
Figure 3:
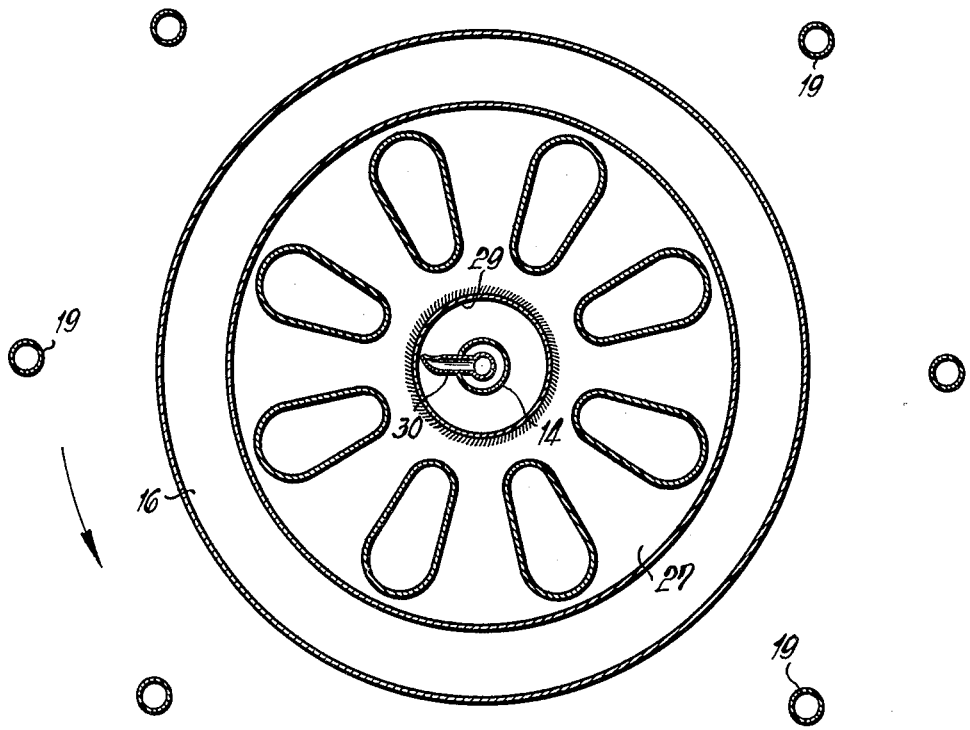
FIGURE 3 is a transverse sectional view of the apparatus shown in FIGURE 1, taken through the heat exchanger in the upper portion of the apparatus.

Proceeding next to FIGURE 1 there is illustrated an assembly of hollow annular members 1 which are positioned vertically with respect to each other so as to define a plurality of vertically arranged spaces. Each plate 1 comprises an inner portion 2 and an outer portion 3 separated by a heat-insulating portion 4.

The inner portions 2 of adjacent annular plates form condensers 5 and adjacent outer portions 3 form evaporators 6. The condensers and evaporators 5 and 6 are connected to a compressor 7 mounted on the bottom of the plate assembly. The pistons for the compressor 8 are mounted on a crank 9 which is either stationary or rotates in a direction opposite to the direction of rotation of a V-pulley 10 which is connected by a V-driving belt to a motor. This V-belt connection provides for a rapid rotation of the assembly of annular plates with the rotary speed depending on the liquid which is to be treated by the apparatus.

A stuffing box 11 may be positioned below the pulley 8.

In the center of the assembly there is a vertical tube 12 which receives refrigerant from the compressor. The tube 12 communicates with the inner ends of the hollow members so as to deliver a refrigerant to the condensers. The refrigerant flows through the condensers and through the restricted openings 13′ to the evaporators and is returned to the compressor through the return line 13.

A stationary frame member 14 supports a supply line 15 through which the liquid which is to be treated is introduced into the apparatus. A plurality of vertical tubes 16 have their upper ends connected to a chamber 17 into which the incoming liquid is received. The tubes 16 have openings 18 into the inner ends of each of the evaporator spaces.

At the outer ends of each of the evaporator spaces 6 are vertical tubes 19 which communicate with the outer ends of the evaporators through openings 20. The vertical tubes 19 are connected to an annular chamber 21 from which liquid is picked up by a stationary arm 22 from openings 23 in the chamber 21. The hollow arm 22 is then mounted on the frame member 14 and opens into a reservoir 24. This arrangement provides for the passage of liquid into the hollow arm 22 when the assembly of plates is rotating.

There is another plurality of vertical tubes 25 located at the outer ends of each of the condensers 5 and communicating therewith through openings 26. The vertical tubes 25 are connected to chambers 27 which are positioned in heat-exchange relationship with the chamber 16 so as to form a heat exchanger whose function will be presently described. The chambers 27 then communicate with an annular member 28 having a plurality of openings 29 on the inner face thereof. The openings 29 communicate with a fixedly mounted hollow arm 30 which is positioned on the frame member 14. The hollow arm 30 communicates with a vertical tube 31 mounted in the center of the assembly. Liquid passing down through the tube 31 then flows radially outwardly through tubes 32 and is discharged at 33.

Due to centrifugal force brought about by rotating the assembly, a layer of liquid builds up on the inner side of the wall having the opening 29. This layer of liquid is picked up by the hollow arm 30. Likewise, a layer of liquid builds up on the inner side of the wall having the openings 23, and is picked up and carried away by the hollow arm 22.

While not illustrated in the drawings, which are primarily schematic, a freely rotating vane assembly is provided adjacent the surfaces 3 in the evaporators 6. These vanes are closely adjacent to the surfaces in order to scrape accumulations of ice crystals therefrom.

As an alternative to this ice-removing structure ultrasonic vibrations may also be applied to the freezing surfaces in order to prevent the formation of ice thereon. This can be done in a known manner.

In carrying out the process of the present invention the refrigerant is compressed in the compressor 7 and then passed through the vertical tubes 12 into the condensers 2 where it is condensed. Suitable control valves may be provided in the portions 4 to regulate the flow of refrigerant into the evaporators 6 where the refrigerant is evaporated and extracts heat from the surrounding area. The refrigerant is then returned to the compressor through the return line 13.

The liquid which is to be concentrated is introduced into the apparatus through the supply line 15, passes through the heat exchanger 17 and downwardly into the vertical tube 16 where it enters the inner ends of the evaporators 6. As the liquid flows radially outwardly through the evaporators 6 under the action of centrifugal force, the water in the liquid is frozen into ice crystals because of the evaporation of the refrigerant in the annular plate portions 3. As described above, suitable means are provided to prevent the accumulation of ice crystals on the freezing surfaces.

As ice crystals are formed in the liquid, the water is removed therefrom and the remaining liquid concentrate has a heavier density than the ice crystals. Accordingly, the liquid concentrate is urged radially outwardly through the evaporators and this movement forces the ice crystals radially inwardly.

The ice crystals pass radially inwardly into the condenser areas 5 where the ice crystals are remelted. The water resulting from melted ice crystals, together with some ice crystals, is then urged radially outwardly into the openings 26, up through the vertical tubes 25 and into the spaces 27 where it passes in heat-exchange relationship with the incoming liquid. This heat-exchange relationship provides for a precooling of the incoming liquid by the ice water and ice crystals removed from the condenser.

A small portion of the water resulting from the melted ice crystals will again flow into the evaporators. This water will be refrozen into ice crystals and will be circulated inwardly as described above.

In addition, the water from the ice crystals which does flow into the evaporators functions to wash the liquid clinging to the ice crystals which are being urged radially inwardly into the condenser. Accordingly, the ice crystals entering the condenser 5 have very little liquid adhering thereto.

The liquid concentrate which flows radially outwardly through the evaporator 6 is gathered into the vertical pipes 19 where it flows upwardly and then radially inwardly to the annular chamber 21 where it is picked up by the hollow arm 22 and delivered into a reservoir 24.

The centrifugal force of the liquid contained in the condensers 5 and evaporators 6 will be forcing the liquid concentrate upwardly through the tubes 19 and radially inwardly to the chamber 21. Since the chamber 21 is spaced further from the center of the assembly of annular plates than the inner ends of the condensers 5, it will be apparent that the centrifugal force of the liquids in the evaporators and condensers will be sufficient to urge the liquid concentrate to flow radially inwardly to the annular chamber 21.

If the above-described apparatus and process is applied to the desalting of sea water, then the process is carried out in the same manner but the concentrate which would be received in the reservoir 24 would represent salt and other minerals in the sea water while the water discharged at 33 would represent the purified sea water.

It is also possible to avoid the accumulation of ice crystals on the freezing surfaces of the evaporators by recirculating a small portion of the liquid concentrate onto the freezing surfaces. Accordingly, the rotation of the annular members will form a thin film of the concentrate on the freezing surfaces which thin film will comprise a separating layer between the entering unconcentrated liquid and the freezing surfaces.

In addition, the concentrate may be recirculated into the center portions of the evaporators so as to precool the liquid entering the evaporators. Thus, portions of water in the entering liquid will be frozen into ice crystals before the liquid actually contacts the freezing surfaces of the evaporators.

In addition, an oil which is neutral to the liquid being concentrated may be used as a heat-transmitting medium. Thus, the freezing in the liquid could be initiated in the center portion thereof, thus preventing ice crystals from accumulating along the freezing surfaces of the evaporators.

It is pointed out that while a piston compressor has been illustrated, other compressors such as turbo-compressors may readily be used in this invention.

The above-described apparatus is operated without any special provision being made for a coolant. The condensers 5 are cooled by the melted ice and the remaining solvent water after concentration of the liquid. However, in certain applications the apparatus can be supplied with cooling water which can be conducted into the melted ice and solvent water which is being removed before this melted ice and solvent water absorbs the latent heat of the freezing mixture in condensers 5.

A specific example of the process of the present invention will next be described. It should be borne in mind that this example is for illustrative purposes only and in no way is to be construed as limiting the invention.

EXAMPLE I

Apple juice having a solids content of 13% and at a temperature of 15° C. is concentrated at the rate of 3000 liters per hour. The apple juice is introduced through the supply line 15 into the heat exchanger 17 wherein it is precooled to 0.4° C. The apple juice then flows through the vertical tube 16 and the openings 18 into the evaporators and enters the evaporators at this temperature of 0.4° C.

The liquid initially entering the evaporators 6 contacts ice crystals in counterflow thereto. Thus, the initial zones of the evaporators 6 are maintained at a temperature of −2° C. at with 30% of the water is frozen out according to the Mollier diagram for fruit and vegetable juices (German Association of Cold Technology Work Sheet 8–02 according to L. Riedel, Cold Technology 2 (1950), No. 8, page 201).

As the apple juice flows radially outwardly through the evaporator 6, the temperature progressively decreases to −20° C. At this point, the solids content is 64% as compared with the initial solids content of 13% which comprises a reduction of 1:5.

A uniform temperature of −25° C. is maintained in the evaporators.

Reference to the accompanying table will show the percentages of solids remaining and the portion of water being removed in the form of ice in the various temperature zones of the evaporators.

The concentrate emerges from the evaporators 6 at a temperature of −20° C. and is passed in counterflow with the incoming apple juice so that the temperature of the concentrate is increased to 13° C. and the incoming apple juice is cooled from 15° C. to 8.4° C. In this heat-exchange about 20,000 kcal. are available for cooling the incoming juice.

At the same time, 2400 liters of ice water are flowing through the heat exchanger 17 in counterflow with the incoming apple juice so that the temperature of this water is increased from 0° C. to 10° C. while the incoming apple juice is further reduced in temperature from 8.4° C. to 0.4° C. About 24,000 kcal. are available at this point for this further cooling of the apple juice. The apple juice then enters the freezing chambers or evaporators through the tubes 16 at a temperature of 0.4° C.

Additional cooling water can be introduced into the axial tube 18 in order to prevent the temperature of the cooling water from increasing to such a degree as described above. The added cooling water would have a temperature of 10° C. and an outlet temperature of 25° C. so that the 51,600 kcal. of equivalent heat would have to be discharged with an additional 1,000 liters of water.

The assembly of annular plates is rotated at 120 revolutions per minute so that the value for $g$ in the peripheral zone of the evaporators is 10 times. Accordingly, the difference of the specific gravity between the concentrate and the ice is increased from 0.4 to 4.0. The concentrate has a specific gravity of 1.3 and the ice has a specific gravity of 0.9 so that the difference therebetween would be 0.4.

The propulsion output is 60 kwh. which is based on the difference in temperature between −25° C. in the evaporator and the temperature of the cooling water of 31° C. together with the melting of 2,400 kg. of ice. The computation is carried out by using the Carnot cycle at an efficiency of about 75%.

It is also pointed out that the water which is gathered by the hollow arm 30 has an excess heat of 51,600 kcal. which equals 60 kwh. The temperature of this water increases from 10° C. to 31° C.

The outer diameter of the annular plates is about 1.2 meters and there are ten annular plates so that twenty freezing surfaces are provided in the evaporator 6. The area of this freezing surface is 10 m.$^2$.

Based on the uniform temperature of −25° C. maintained in the evaporators, the various temperature differences ($d_t$) as set forth in the accompanying table, will be present at the various temperature zones in the evaporator. m.$^2 \cdot k$ represents the freezing surface multiplied by the coefficient of heat transmission. This can be computed from the quantity of ice frozen out in any temperature zone multiplied by the heat of fusion or the heat of fusion of solidification respectively, divided by the difference in temperature in the respective temperature zone. The total required freezing surface for the evaporators is the sum of all of the above-mentioned values at the various temperature zones divided by the coefficient of heat transmission in rotating heat-exchanging surfaces. Addition of the m.$^2 \cdot k$ values gives 9991 which must be divided by the $k$ value of 1,000 kcal. per h. per m.$^2$ per ° C. Using an approximation of 10,000, division by the $k$ value of 1,000 will result in a required freezing area of about 10 m.$^2$.

*Table I*

| Temperature In Evap. | Concentrate (liters) | Percent solids | Water (liters) | Percent of Ice and water | Ice (liters) | $d_t$ | m.$^2 \cdot k$ |
|---|---|---|---|---|---|---|---|
| −2 | 2,220 | 18 | 1,820 | 30 | 780 | 23 | 2,712 |
| −3 | 1,674 | 24 | 1,274 | 30 | 546 | 22 | 1,985 |
| −4 | 1,394 | 29 | 994 | 22 | 280 | 21 | 1,066 |
| −5 | 1,245 | 32 | 845 | 15 | 149 | 20 | 596 |
| −6 | 1,093 | 37 | 693 | 18 | 152 | 19 | 482 |
| −7 | 1,024 | 39 | 624 | 10 | 69 | 18 | 306 |
| −8 | 948 | 42 | 548 | 12 | 75 | 17 | 353 |
| −9 | 893 | 45 | 493 | 10 | 55 | 16 | 275 |
| −10 | 843 | 48 | 443 | 10 | 49 | 15 | 261 |
| −12 | 786 | 51 | 386 | 13 | 57 | 13 | 350 |
| −14 | 724 | 55 | 324 | 16 | 62 | 11 | 451 |
| −16 | 675 | 59 | 275 | 15 | 49 | 9 | 435 |
| −18 | 648 | 62 | 248 | 10 | 28 | 7 | 320 |
| −20 | 622 | 64 | 222 | 10 | 25 | 5 | 400 |
| Total | | | | | | | 9,991 |

Thus it can be seen that the present invention has provided a simple and efficient apparatus for the continuous freeze concentration of liquids containing solids.

It will be understood that this invention is susceptible to modification in order to adapt it to different usages and conditions and, accordingly, it is desired to comprehend such modifications within this invention as may fall within the scope of the appended claims.

What is claimed as this invention is:

1. An apparatus for the freeze concentration of aqueous liquids containing solids, and comprising an assembly of hollow annular members spaced vertically above each other to define a plurality of vertically arranged annular spaces and a refrigerating system connected to said hollow annular members for circulating a refrigerant therethrough so that the inner portions of said annular spaces define condensers and the outer portions thereof define evaporators, a vertical tube in the center of said assembly of annular members, means on the outer ends of said condensers and connected to said vertical tube for withdrawing ice crystals and melted ice crystals from said annular spaces, a plurality of tubes in said vertical tube and connected with said refrigerating system, means connected to said plurality of tubes for circulating a refrigerant through said condensers and evaporators and returning the refrigerant to the refrigerating system, means for introducing an aqueous liquid containing solids into the inner ends of said evaporators, means on the outer ends of said evaporators for withdrawing liquid concentrate therefrom, and means for rotating said assembly of annular members.

2. An apparatus for the freeze concentration of aqueous liquids containing solids, and comprising an assembly of hollow disks spaced vertically above each other to define a plurality of vertically arranged annular spaces alternating disks defining refrigerant circuit and aqueous liquid paths, respectively, a casing enclosing said assembly of disks, and a refrigerating system including a compressor mounted on the bottom surface of said casing and connected to the inner and outer edges of said disks in the refrigerant circuit by vertical tubes for circulating a refrigerant therethrough so that the inner portions of said annular spaces define condensers and the outer portions thereof define evaporators, and means for rotating said assembly of disks and vertical tubes intermediate the center and outer extremity of the aqueous liquid disks for admitting sea water and removing pure water.

3. An apparatus for the freeze concentration of aqueous liquids containing solids, and comprising an assembly of hollow annular members spaced vertically above each other to define a plurality of vertically arranged annular spaces, a refrigerating system connected to said hollow annular members for circulating a refrigerant therethrough so that the inner portions of said annular spaces define condensers and the outer portions thereof define evaporators, control valves in said annular members between said condensers and evaporators to control the flow of refrigerant from said condensers to said evaporators, a vertical tube in the center of said assembly of annular members, means on the outer ends of said condensers and connected to said vertical tube for withdrawing ice crystals and melted ice crystals from said annular spaces, a plurality of tubes in said vertical tube and connected with said refirgerating system, means connected to said plurality of tubes for circulating a refrigerant through said condensers and evaporators and returning the refrigerant to the refrigerating system, means for introducing an aqueous liquid containing solids into the inner ends of said evaporators, means on the outer ends of said evaporators for withdrawing liquid concentrate therefrom, and means for rotating said assembly of annular members.

4. An apparatus for the freeze concentration of aqueous liquids containing solids, and comprising an assembly of hollow annular members spaced vertically above each other to define a plurality of vertically arranged annular spaces, a refrigerating system connected to said hollow annular members for circulating a refrigerant therethrough so that the inner portions of said annular spaces define condensers and the outer portions thereof define evaporators, a vertical tube in the center of said assembly of annular members, means on the outer ends of said condensers and connected to said vertical tube for withdrawing ice crystals and melted ice crystals from said annular spaces, a plurality of tubes in said vertical tube and connected with said refrigerating system, means connected to said plurality of tubes for circulating a refrigerant through said condensers and evaporators and returning the refrigerant to the refrigerating system, a plurality of vertical tubes connected to the inner ends of said evaporators to introduce an aqueous liquid containing solids therein, a plurality of vertical tubes connected to the outer ends of said evaporators to withdraw the liquid concentrate therefrom, and means for rotating said assembly of annular members.

5. An apparatus for the freeze concentration of aqueous liquids containing solids, and comprising an assembly of hollow annular members spaced vertically above each other to define a plurality of vertically arranged annular spaces, a refrigerating system connected to said hollow annular members for circulating a refrigerant therethrough so that the inner portions of said annular spaces define condensers and the outer portions thereof define evaporators, means for rotating said assembly of annular members, a vertical tube in the center of said assembly of annular members, a plurality of vertical tubes connected to the outer ends of said condensers, a plurality of tubes in said vertical tube and connected to said refrigerating system, means connected to said plurality of tubes in said vertical tube for circulating a refrigerant through said condensers and evaporators and returning the refrigerant to the refrigerating system, means for introducing a liquid containing solids into the inner ends of said evaporators, means on the outer ends of said evaporators for withdrawing liquid concentrate therefrom, and means connected between said vertical tubes and said vertical tube for withdrawing ice crystals and for passing said melted ice in heat-exchange relationship with the liquid prior to introducing the liquid into the evaporators to precool the liquid.

6. An apparatus for the freeze concentration of aqueous liquids containing solids, and comprising an assembly of hollow annular members spaced vertically above each other to define a plurality of vertically arranged annular spaces and a refrigerating system connected to said hollow annular members for circulating a refrigerant therethrough so that the inner portions of said annular spaces define condensers and the outer portions thereof define evaporators, a vertical tube in the center of said assembly of annular members, means on the outer ends of said condensers and connected to said vertical tube for withdrawing ice crystals and melted ice crystals from said annular spaces, a plurality of tubes in said vertical tube and connected with said refrigerating system, means connected to said plurality of tubes for circulating a refrigerant through said condensers and evaporators and returning the refrigerant to the refrigerating system, means for introducing an aqueous liquid containing solids into the inner ends of said evaporators, means on the outer ends of said evaporators for withdrawing liquid concentrate therefrom, means for rotating said assembly of annular members, and means in said annular spaces between said evaporators and said condensers for regulating the flow of melted ice crystals from said condensers to said evaporators whereby the liquid concentrate adhering to said ice crystals is washed therefrom.

7. An apparatus for the freeze concentration of aqueous liquid containing solids, and comprising an assembly of hollow annular members spaced vertically above each other to define a plurality of vertically arranged annular spaces and a refrigerating system connected to said hollow annular members for circulating a refrigerant therethrough so that the inner portions of said annular spaces define condensers and the outer portions thereof define evaporators, a vertical tube in the center of said assembly of annular members, means on the outer ends of said condensers and connected to said vertical tube for withdrawing ice crystals and melted ice crystals from said annular spaces, a plurality of tubes in said vertical tube and connected with said refrigerating system, means connected to said plurality of tubes for circulating a refrigerant through said condensers and evaporators and returning the refrigerant to the refrigerating system, means for introducing an aqueous liquid containing solids into the inner ends of said evaporators, means on the outer ends of said evaporators for withdrawing liquid concentrate therefrom, means for rotating said assembly of annular members, a freely rotating vane assembly immediately adjacent the surfaces of said evaporators to scrape ice crystals accumulating on these freezing surfaces.

References Cited by the Examiner
UNITED STATES PATENTS

| | | | |
|---|---|---|---|
| 1,999,712 | 4/35 | Zorn et al. | 62—58 |
| 2,419,881 | 4/47 | Borgerd et al. | 62—124 |
| 2,705,407 | 4/55 | Colonna | 62—67 |
| 2,946,204 | 7/60 | Justice | 62—499 |

NORMAN YUDKOFF, *Primary Examiner.*

ROBERT A. O'LEARY, *Examiner.*